Jan. 2, 1940. O. H. DICKE 2,185,334
CLOCK SETTING MEANS
Filed June 5, 1934 3 Sheets-Sheet 1
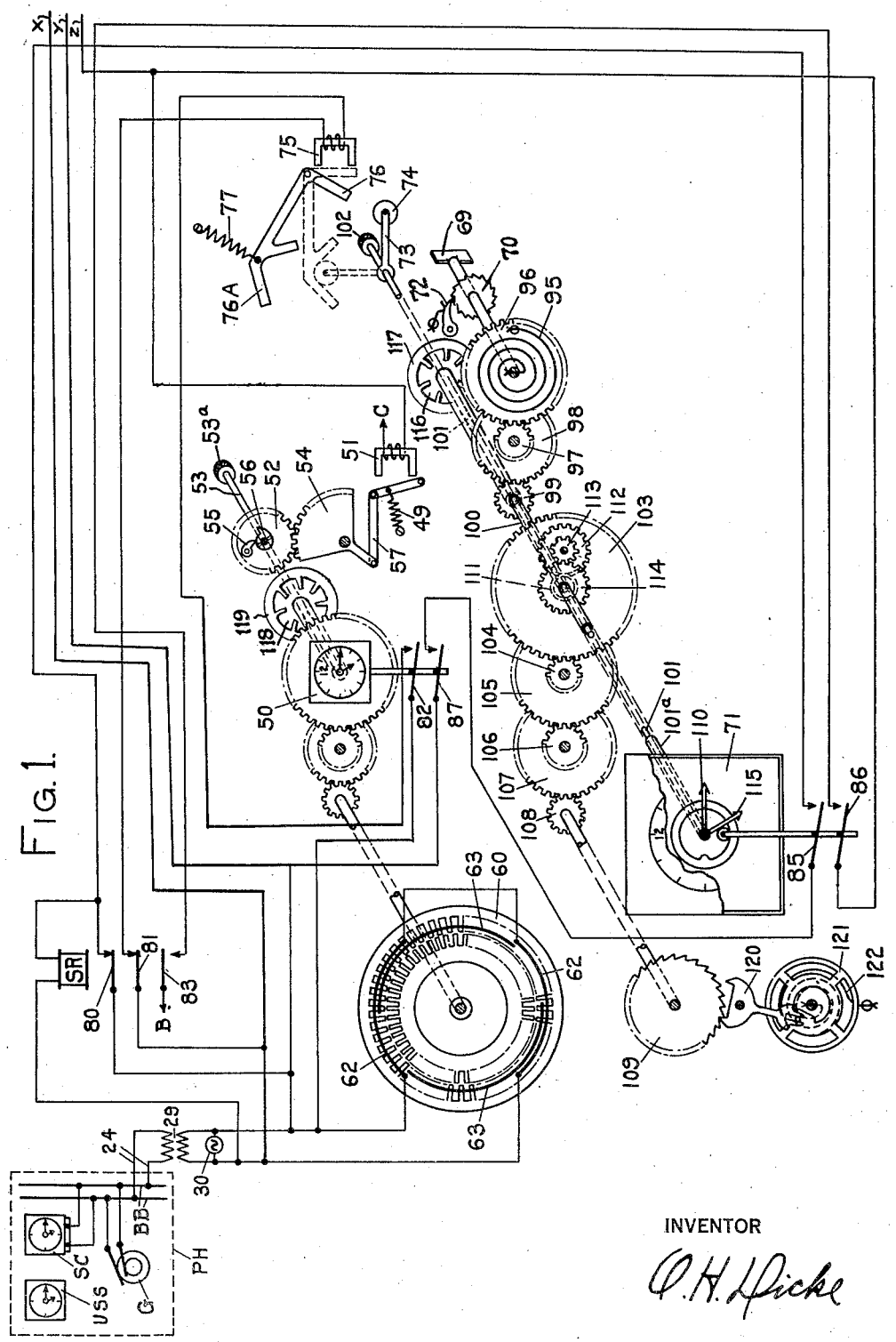
INVENTOR
O. H. Dicke

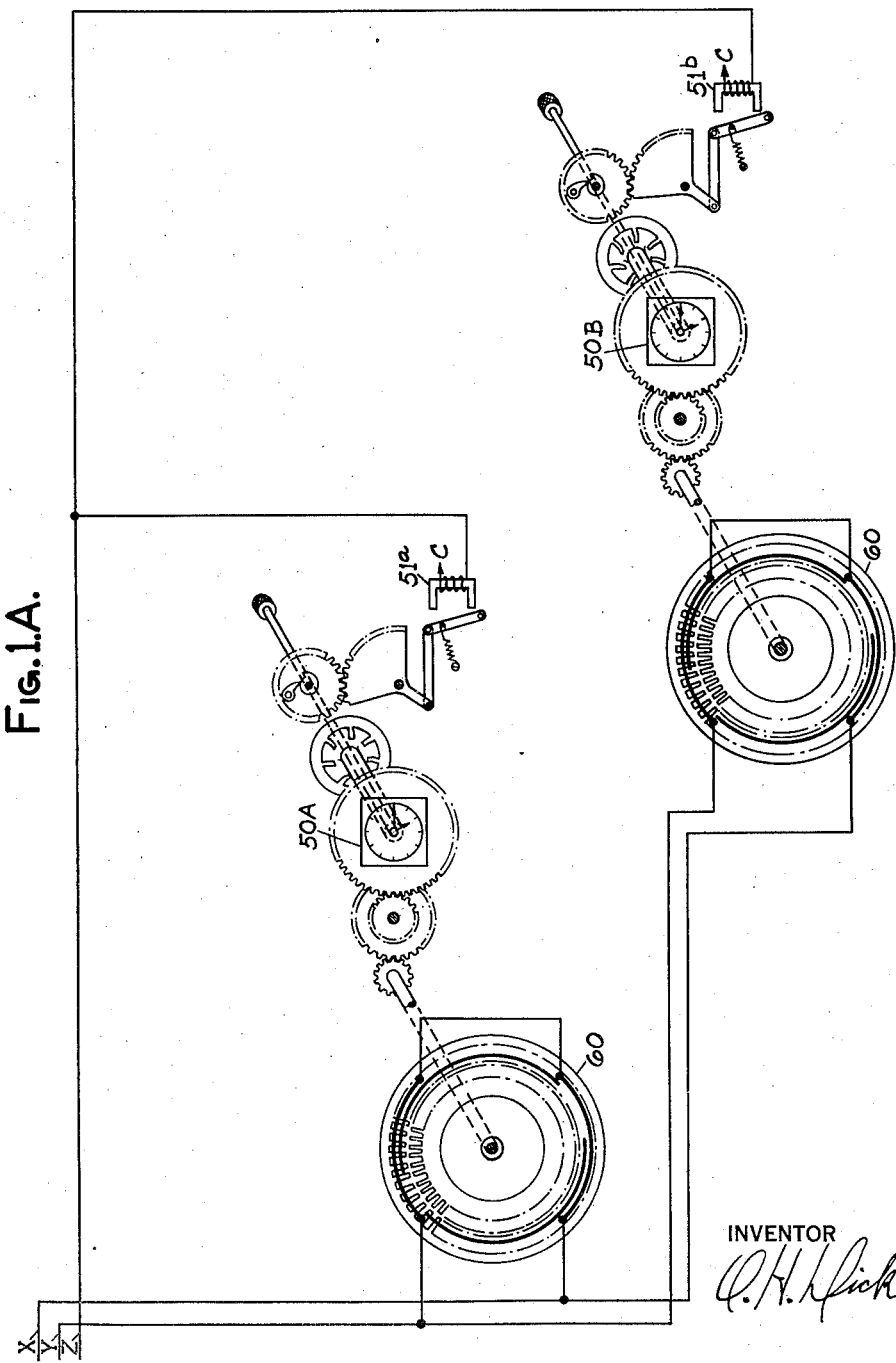

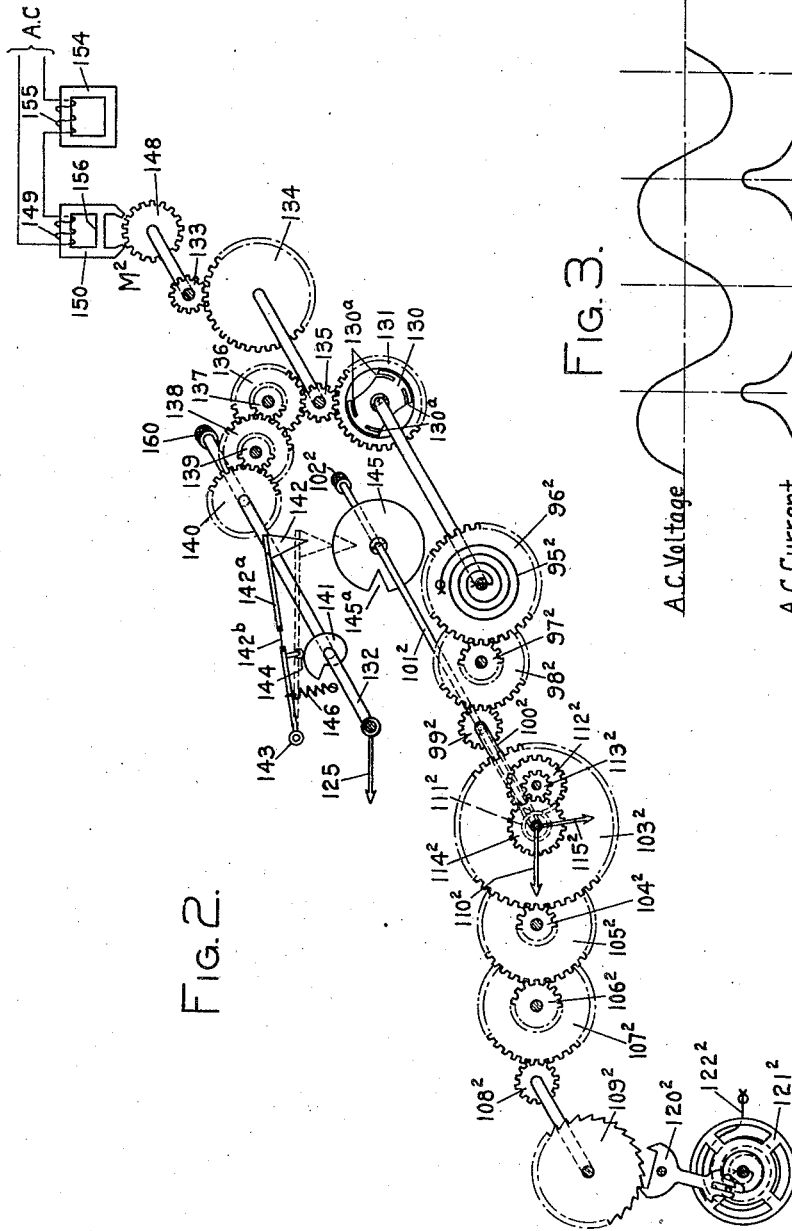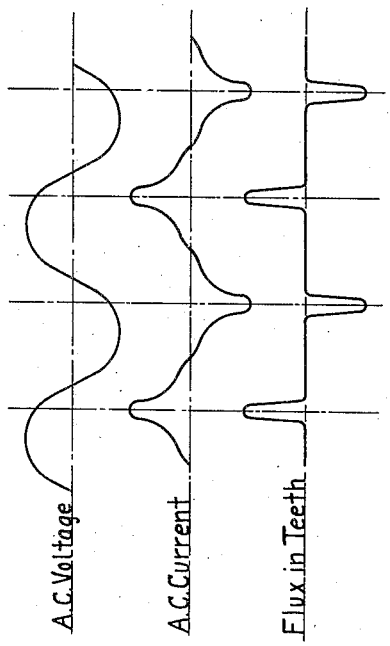

Patented Jan. 2, 1940

2,185,334

UNITED STATES PATENT OFFICE 2,185,334

CLOCK SETTING MEANS

Oscar H. Dicke, Rochester, N. Y.

Application June 5, 1934, Serial No. 729,080

22 Claims. (Cl. 58—35)

This application is a continuation in part of my copending application Ser. No. 365,584 filed May 23, 1929, which is a continuation in part of my prior application Ser. No. 158,370 filed December 31, 1926.

This invention relates to means for transmitting information over power circuits, and more particularly to the transmission of time signals over an electric light and power distribution system.

Some of the objects of the present invention reside in the provision of means whereby the number of cycles per hour of power current generated may be kept constant and by the provision of synchronous motor clock means for indicating time at the power consumer, the provision of means for setting a mechanical escapement clock by the synchronous motor clock, and for setting, if desired, the synchronous motor clock by the mechanical escapement clock in case of power failure since the last previous setting.

Other objects, purposes and characteristics of the present invention will in part be obvious from the accompanying drawings and in part appear from the following detailed description.

In describing the invention in detail reference will be made to the accompanying drawings in which:

Figs. 1 and 1A when laid end to end show a power house equipped with a time transmitting mechanism embodying the present invention showing only one of a large number of power feeders having time indicating and setting mechanism operated therefrom;

Fig. 2 shows a modified form of the invention; and

Fig. 3 shows graphs of the voltage and current flow, and the corresponding flux densities in the teeth of the synchronous motor shown in Fig. 2.

Referring particularly to Fig. 1 the dotted rectangle P. H. represents a power house having one or more direct or alternating current generators of which the generator G, assumed to be a sixty cycle alternating current generator, only has been shown. This generator is connected to the power house bus bars BB through suitable switch means (not shown). In accordance with one form of the present invention it is proposed to indicate the time of day, at the various consumer residents, offices or factories, by driving clock hands by a synchronous motor of the usual or special construction, these clock hands only indicating the proper time if the power house equipment generates the requisite number of cycles per hour, and for this reason the power house is furnished with a synchronous motor driven clock SC and a standard clock USS indicating United States observatory time, and the power house attendant is required to keep his frequency such that the synchronous clock SC indicates the same time as the standard clock.

To one of the lighting feeders, namely feeder 24, is connected a lighting transformer 29 which reduces the voltage from the distribution potential, of say 2200 volts, to a voltage suitable for consumers use, say 110 volts. To illustrate a lighting load, for which this distributing network is primarily used, the lamp 30 has been shown. The distribution load may include some motor load which has for convenience not been shown.

The clock 71 conventionally represents a clock of the mechanical escapement balance wheel type, and except for the electrically actuated setting mechanism 73—77 and the clock operated contacts 85 and 86, constitutes the usual and well known escapement clock including the usual winding key 69, ratchet wheel 70, ratchet dog 72, main spring 95 connecting the ratchet wheel 52 with drive gear 96, drive gears 98, 103, 105 and 107 and driven pinions 97, 99, 104, 106 and 108. The pinion 99 is connected to gear 103 by a sleeve 100, which gear 99 is frictionally connected to the minute shaft 101 supporting the minute hand 110 and a setting knob 102, as by a spider 116 integral with the pinion 99 and frictionally engaging the disk 117 secured to the minute shaft 101, thus permitting the minute shaft to be set. The minute shaft 101 (rotating one revolution per hour) through the medium of the usual pinion 111, driving a gear 112 having attached thereto a pinion 113 which drives the gear 114, having directly connected thereto by sleeve 101ᵃ the hour hand 115 (rotating one revolution in twelve hours). The pinion 108 is directly connected to the escapement wheel 109, and this escapement wheel 109 oscillates the escapement pallet 120 and balance wheel 121, the balance wheel 121 being biased to the normal position by the hair spring 122.

It is well understood by those skilled in the art of chronometric instruments, that a clock of the mechanical escapement type, whether of the balance wheel or pendulum type, can not possibly keep perfect time, and in accordance with the invention illustrated in connection with the clock 71 of Fig. 1, it is proposed to electro-magnetically set the clock 71. In the event of power failure for a short time the clock 71 will operate without the superimposed synchronous control and will therefore have the unpreventable error of this clock injected only until the end of the hour in which such electric power failure is terminated. If the mechanical clock, which is to have synchronized control superimposed thereon, is a pendulum clock the electro-magnetic action will act on the clock in the same manner.

Let us now observe how, upon the resumption of power after power failure, the setting of the electric clock 50 by closure of the clock setting circuit is accomplished. The energization of the magnet 51 causes pinion 52 to be rotated one complete revolution through the medium of gear sector 54 and link 57 against the action of spring 49. This pinion 52 is loose on the minute shaft 53, containing a setting knob 53a, and its rotation in the clockwise direction causes dog 55 to engage the single notch ratchet tooth 56 secured to the minute shaft 53, to be rotated in the event the clock has lost time, and will move the minute hand to the top. The usual frictional connection between the minute shaft and the clock hand driving mechanism is preferably provided. This frictional connection may comprise a spider 118 integral with the minute gear and frictionally engaging the disc 119 secured to the minute shaft 53, as shown. The clock hands of the clock 50 are driven by a synchronous motor of any suitable construction but are preferably driven by a novel synchronous motor 60 having an extremely low synchronous speed. The operation of this novel motor is based on the principle that if the number of teeth of the rotor is different than the number of teeth in the stator only certain of these teeth can be in alignment, and that a rotating magnetic field will cause the alignment of the teeth to rotate with the magnetic field. In this particular arrangement shown, there are 48 teeth on the stator and 50 on the rotor so that the rotor will rotate through an angle of two teeth for each cycle assuming a two-pole distributed coil type stator winding 62, and if a sixty cycle power current is used the motor will have a synchronous speed of 144 revolutions per minute. Any desired synchronous speed can of course be obtained by selecting the number of rotor and stator teeth per magnetic pole and the number of magnetic poles. The stator winding is preferably a distributed winding and may be two phase, of which one phase is connected directly to the line and the other phase derives its current from a phase shifter such as shown in the Lucas patent hereinafter referred to, or the winding may be connected split phase or it may be a single phase winding 62 having short circuited shading rings or coils 63 associated therewith, so as to obtain a two-pole rotating magnetic field. In any event, the preferred type of motor has a large number of teeth per pole and has a difference of one between the rotor and stator teeth per pole, and is constructed to operate on single phase current. The minutes shaft 53, and in turn both the minute and the hour hand, are driven by the motor 60 through any suitable type of gear train, such as shown, assuming of course that the proper gear ratio is selected, the small or 12 hour hand being driven by the minute shaft by suitable gearing. The clock 71 may drive or control in any desired manner any number of suitable repeater clocks, not shown, and may set any number of synchronous motor driven clocks by means as shown at 51a and 51b. It should also be noted that if the clock 50 should not run for a short period of time due to power failure, this clock would be set at the end of the hour and would therefore indicate the correct time as indicated by clock 71 thereafter, the clock of course restarting upon the return of power.

The mechanical escapement clock 71 may be synchronized by electric impulses, the time spacing of which is determined by contacts operated by a synchronous motor 60. In the particular arrangement shown the synchronous motor 60 has the number of teeth per pole of the rotor and stator so chosen that the rotor through suitable gearing will cause the clock 50 to indicate correct time.

As is apparent from the foregoing description and as is well known by power distribution engineers, power failures will at times occur, and in accordance with one form of the present invention it is proposed to employ the mechanical escapement clock 71 and a synchronous electric motor clock 50 and to provide means for setting the mechanical escapement clock 71 by the electric motor clock at repeated intervals so long as no power failure has occurred and to set the synchronous clock by the mechanical escapement clock one or more times after each power failure, depending on the duration of the power failure, and whether the entire power failure occurs in the same hour.

Referring to Fig. 1 the clock 50 is a synchronous motor clock having a motor 60 provided with means for setting the clock 71 hourly or in multiple time units thereof, and is provided with contacts 82 and 87, that close momentarily at exactly the end of each hour, or other time unit. The clock 71 is a mechanical escapement clock which may or may not be electrically wound automatically, and for simplicity a hand winding key 69 only has been shown. Since a clock of the mechanical escapement type of good quality is invariably correct within a very small margin, a simple form of setting means, which can correct a small error only, may be employed. In the conventional arrangement shown the large hand 110, which rotates once per hour, has its shaft 101 provided with a rotating arm 73 preferably containing a roller 74. An electro-magnet 75 is provided, having an armature 76 which is held in its retracted position by a spring 77. This armature 76 preferably has a centering device 76A associated therewith which is constructed so that if the long hand is near the top, energization of the electro-magnet 75 will bring it exactly to the top.

In this form of the invention there is provided a stick relay SR for determining whether the synchronous motor clock 50 shall set the mechanical escapement clock 71, or the mechanical escapement clock 71 shall set the synchronous motor clock 50. This stick relay SR is normally energized and receives its energizing current through the stick circuit including the secondary winding of transformer 29, the winding of the relay SR and the front contact 80 of this relay. So long as there is no power failure the mechanical escapement clock 71 will be set at the end of each hour by the energization of the electro-magnet 75 through the following circuit: beginning at the secondary winding of transformer 29, front contact 81 of the relay SR, winding of the electro-magnet 75, contacts 82 of the synchronous motor clock 50, closed momentarily exactly when the large hand reaches the top or full hour position, back to the transformer 29. It thus appears that closure of the contacts 82 at the end of each hour sets the clock 71 providing no power failure has taken place.

Let us now assume that by reason of line trouble, or the like, power goes off at 5:15 p. m. and that the motor driven clock 50 stops. This failure of power also drops the stick relay SR; the closure of back contact 83 does not however complete any circuit at this time. Let us now assume that power does not come back on again until 6:20 p. m. When it is 6:00 p. m. by the clock 71 the contacts 85 and 86 close momentarily, and closure of the contact 86 closes a circuit through the winding of the electro-magnet 51 which includes the back contact 83 of the relay SR; this circuit also including an independent source of energy having terminals B and C. The completion of this circuit causes the hands of the clock 50 to be moved to indicate 6 p. m. At 6-20 p. m. when power comes back on, as has been assumed, the clock 50 which did not operate since 5-15 p. m., starts again, but for obvious reasons this clock 50 is now 20 minutes slow. The return of power however does not pick up the stick relay SR, because, although contacts 87 are closed, the contacts 85 are open and the pick-up circuit for relay SR is open. When the clock 71 indicates 7 p. m. (the correct time within a very small degree) the clock 50 will indicate 6:40 p. m. and the contacts 82 and 87 will be open. In other words, the relay SR will not be picked up, but closure of contacts 86 will effect setting of clock 50 for reasons already given. The setting of clock 50 will effect closure of contacts 82 and 87, and since this happens very quickly the contact 85 of clock 71 will still be closed, and the following pick-up circuit for the relay SR will be closed: beginning at the secondary winding of the transformer 29, winding of the relay SR, contacts 85 and 87, back to the other terminal of said secondary winding. The moment the relay SR assumes its energized position its stick circuit, including the stick contact 80, heretofore traced is completed, and the relay remains energized. By reason of the rapidity with which the relay SR picks up, it is possible that the clock 71 will also be set for obvious reasons, but since it already assumes the even hour position no harm is done whether it is set or not at this time. It is desired to be understood that although only one motor driven clock has been shown in Fig. 1 any number of such clocks, such as clocks 50A and 50B of Fig. 1A, may be used all of which are set after each power failure in a manner as described in connection with the clock 50, and as shown by electro-magnets 51$^a$ and 51$^b$. The motors 60 of clocks 50A and 50B are energized from the same alternating current source as is the motor 60 of clock 50, as by wires X and Y, and the electro-magnets 51, 51$^a$ and 51$^b$ are all connected in multiple, as through the medium of a wire Z and a common return wire C.

The phase shifter above mentioned comprises a static transformer of peculiar construction and is fully described in the patent to Lucas No. 1,566,333 dated December 22, 1925; and consists of a core of laminated transformer iron, preferably of the general shape shown in said patent, which contains a primary winding, a secondary winding and two bucking or shading coils. This phase shifter is so constructed that the voltage induced in secondary winding is displaced substantially 90 electrical degrees with respect to the voltage impressed upon the primary winding.

Referring now to Fig. 2 of the drawings, the form of the invention illustrated therein employs mechanical rather than electrical means for setting the escapement clock shown in Fig. 2. Also, in this form of the invention the electric synchronous motor clock having a minute hand 125 (the hour hand being preferably omitted) is not automatically set, but is set by hand when the non-self starting synchronous motor M$^2$ of this electric clock is manually started.

Generally speaking, in this form of the invention, it is proposed to employ a suitable time piece, such as the escapement clock having hands 110$^2$ and 115$^2$, and to set this time piece at intervals by a non-self starting synchronous motor electric clock. This setting operation may take place hourly, as is true of the particular form of the invention shown, or may take place every fifteen seconds or every twelve hours, or in fact after any other desired equal intervals of time, the object being to have the setting operation occur at equal repeated time intervals. This mechanical time piece has been illustrated as an escapement clock of the balance wheel type, and for convenience all like parts of this clock have been assigned like reference characters to those in Fig. 1, but having affixed thereto the distinctive exponents $^2$.

The escapement clock of Fig. 2 differs from the escapement clock of Fig. 1, by the provision of a slip friction clutch 130—131 for winding the main spring 95$^2$ automatically from the gear train of the electric clock containing the minute hand 125, instead of the manual winding key. This electric clock comprises a minute shaft 132 driven by a non-self starting synchronous motor M$^2$ through the medium of reduction gearing including gears 134, 136, 138 and 140 driven respectively by pinions 133, 135, 137 and 139.

The slip clutch mentioned comprises a clutch member 130, having slots 130$^a$ cut therein to render this member yieldable and expandable, so as to frictionally engage the annular surface of a counter-sunk circular cavity in the gear 131. This gear 131 as well as the gear 136 is driven by the pinion 135.

The gear ratio between the synchronous motor M$^2$ and the minute shaft 132 is so chosen that the minute shaft 132 rotates exactly one revolution per hour with exactly 60 cycle applied to the motor M$^2$, provided of course that the motor M$^2$ has been started. This motor will not operate with power applied thereto unless it is first started, as by rotating it by hand.

The gear ratio between the synchronous motor M$^2$ and the minute shaft 101$^2$ is preferably such that the clutch 130—131 slips about one-twentieth of the time. This construction would cause the escapement clock to be fully rewound in twenty hours if the synchronous motor had been standing still for one hour.

On the minute shaft 132, of the electric clock portion of the mechanism, is contained a cam 141 for lifting through the medium of the roller 144 the V-shaped hammer 142 pivoted about the pin 143. The hammer 142 is biased to a position to just clear the setting disk 145, with the roller 144 in its lowest position, by the tension spring 146. The hammer handle 142$^a$ is provided with a reduced spring section 142$^b$, rendering this handle flexible at this point so that as the roller 144 drops into the hollow portion of the cam 141, the hammer 142 will by its inertia fly beyond its biased position and into the V-shaped notch 145$^a$ in the setting disk 145, the various elements being so constructed and proportioned that the setting disk and clock hands 110$^2$ and 115$^2$ will be set to indicate the correct time, as indicated by the electric clock through its hour hand 125. This construction is such that no matter at what time alternating current fails the hammer 142 will not interfere with the free operation of the escapement clock.

Although the synchronous motor M² shown in Fig. 2 may be of any suitable construction, it is preferably of improved construction. As shown the motor M² comprises a toothed rotor 148 having either pointed or dull teeth, and a stator 150 having projecting poles each having one or more teeth spaced to cooperate with the rotor teeth simultaneously.

The stator or magnet 150 is provided with a coil 149, which is included in series with a reactor comprising the laminated iron core 154 on which is contained a coil 155. This reactor is of special importance, in that it not only limits the current flow, but in that it also changes its wave shape. The cross-section of the core 154 and the number of turns in the coil 155 are so chosen that the core becomes saturated with flux before the voltage of the source, as illustrated (see "A. C. voltage") in Fig. 3, reaches the maximum value, for which reason the current builds up suddenly near the middle of each current wave as illustrated in Fig. 3 (see "A. C. current"). As this magnetizing current now flows through the coil 149 the initial magnetism flows through the shunt or magnetic by-pass 156, but as the peaked portion of the current wave passed through the coil 149, the shunt 156 having become saturated causes flux in the rotor to build up suddenly to a high value at the middle of the flux wave, as shown by the curve (see "flux in teeth") in Fig. 3. It is of course understood that in the three curves illustrated in Fig. 3 time is plotted from left to right, whereas points above the horizontal line designate positive voltage, current or flux, and points below this line represent negative values of voltage, current or flux.

Attention is particularly directed to the manner in which magnetism of special wave form is derived from a sine wave voltage. This magnetism is very peaked and is present in any material degree only during the middle of the corresponding current wave. This is very desirable and allows the rotor to operate by its inertia between two successive magnetic waves. In fact, if the magnetic waves were of sine wave shape the magnetism would at times tend to retard the rotation of the rotor, even though not sufficient to stop or reverse it. It thus becomes clear that if the period of magnetization of the rotor is equal to, or less than, the period of non-magnetization there will be intermittent drawing of the teeth of the rotor toward the poles.

Although the operation of the form of the invention shown in Fig. 2 is apparent from the foregoing description, a brief description of the operation will be given. So long as there is no power failure the escapement clock shown in Fig. 2 will be set at repeated definite time intervals by the V-shaped hammer 142 striking into the V-shaped notch 145ª and at the same time the motor M² will wind the main spring 95 through the medium of the slip clutch 130—131. Upon the temporary failure of power, however, the non-self starting motor will stop and will remain at stop in spite of the return of alternating current power. The fact that the synchronous motor has stopped will, as by the sound of the clock, soon be observed. The attendant, or housewife, will then restart the motor M² and will set the electric clock hand 125, through the medium of setting knob 160, to indicate the same time as that indicated by the main minute hand 110² so that at the end of the hour the hammer 142 will be over the notch 145ª. By this operation of the invention illustrated in Fig. 2 the escapement clock will be inaccurate only to the extent of the inaccuracy of the escapement clock during the time the synchronous motor is standing still.

Having thus shown and described several embodiments of my invention, and having shown them rather specifically although certain elements thereof have been illustrated conventionally, it is desired to be understood that this has been done to exemplify the invention in a convenient manner; and it is desired to be understood that the invention is not limited to the particular arrangement shown either specifically or conventionally, and that various changes and modifications may be made to adapt the invention to any particular light and power distributing or similar system and any particular type of clock without departing from the scope of the invention or the idea of means underlying the same.

What I desire to secure by Letters Patent is:

1. In a system for indicating correct time, the combination with a mechanical escapement, stored energy means for driving said escapement, time manifesting means frictionally connected to said escapement, a light and power distribution system delivering alternating current at a fixed average rate of cycles, a synchronous motor operated continuously by current distributed by said system, and means operated by said motor for after each of successive equal time intervals setting said time manifesting means, said means being at least temporarily rendered ineffective after a temporary cessation of alternating current.

2. In a system for indicating correct time, the combination with a clock of the mechanical escapement type including time manifesting means frictionally connected to escapement mechanism thereof, a power distribution system delivering alternating current at a fixed average rate of cycles, apparatus including a synchronous motor operated continuously by current derived from said system, and means operated by said motor for at the ends of equal time intervals setting said time manifesting means with respect to said escapement mechanism as permitted by said frictional connection, said apparatus being constructed to be effective to set said time manifesting means as specified only so long as no temporary power cessation has occurred.

3. In combination, a clock movement including means rotated at substantially constant speed, time manifesting means frictionally driven by said first mentioned means, a third means rotated continuously by alternating current and at a rate proportionate to the frequency of such alternating current, and a fourth means for after each predetermined number of revolutions of said third means causing said third means to actuate said time manifesting means with respect to said first mentioned means to cause said time manifesting means to indicate time in accordance with the frequency of such alternating current so long as no temporary cessation of alternating current has occurred.

4. In combination, a clock including means rotated at substantially constant speed, time manifesting means frictionally driven by said first mentioned means, a third means rotated by alternating current and at a rate proportionate to the frequency of such alternating current, and a fourth means controlled in accordance with temporary failure of such alternating current to at times cause said third means to operate said time manifesting means and at other times cause said first mentioned means to operate said third means.

5. Means for indicating correct time at a power consumer location deriving alternating current power from a power distribution system delivering alternating current regulated to a definite number of cycles per unit of time comprising; a clock movement including a first means rotated at substantially constant speed, time manifesting means frictionally driven by said first mentioned means; a synchronous motor operated by power derived from said power system, and means driven by said synchronous motor for at intervals mechanically setting said time manifesting means with respect to said first means.

6. Means for indicating correct time at a power consumer location deriving alternating current power from a power distribution system delivering alternating current regulated to a definite number of cycles per unit of time comprising; a clock movement including a first means rotated at substantially constant speed; time manifesting means frictionally driven by said first mentioned means; a synchronous motor operated by power derived from said power distribution system and mechanical means, driven by said synchronous motor, for at intervals mechanically setting said time manifesting means with respect to said first means; said mechanical means being so constructed that it upon failure of power at any time cannot interfere with the free movement of said time manifesting means.

7. Means for indicating correct time at a power consumer location deriving alternating current power from a power distribution system delivering alternating current regulated to a definite number of cycles per unit of time comprising; a clock movement including a first means rotated at substantially constant speed; time manifesting means frictionally driven by said first mentioned means; a synchronous motor energized by current from said system; and snap-acting mechanical means, driven by said synchronous motor, for at intervals by snap action setting said time manifesting means with respect to said first means in a manner not to interfere with the free movement of said time manifesting means after the snap action has taken place.

8. Means for indicating correct time at a power consumer location deriving alternating current power from a power distribution system delivering alternating current regulated to a definite number of cycles per unit of time comprising; a clock movement including, a source of stored energy, a first means rotated at substantially constant speed by power derived from said source, time manifesting means frictionally driven by said first mentioned means; a friction slip clutch; a synchronous motor operated by power derived from said system for, through the medium of said friction slip clutch, replenishing said source of stored energy; and mechanical snap-acting means driven by said motor for at definite time periods setting said time manifesting means, said snap-action means including a quick-acting member which will but momentarily remain in a position to interfere with the free movement of said time manifesting means.

9. In combination with a power distribution system for distributing alternating current for light and power purposes, but having its frequency regulated to distribute a predetermined number of cycles of current per hour for time manifesting purposes; of a clock of the mechanical escapement type including a time train, time manifesting means frictionally driven by said time-train, and an oscillating escapement driven by said time train; a first electric clock including a synchronous motor operated by current from said power system, and including time manifesting means frictionally driven by said motor; means controlled by said first electric clock for at definite time intervals, as manifested by said electric clock, setting the time manifesting means of said mechanical escapement clock; one or more electric clocks each including a self-starting synchronous motor operated by current from said power system; and means controlled by said escapement clock for at intervals setting said other electric clock or clocks by the time manifesting means of said mechanical escapement clock whereby said escapement clock will indicate time in accordance with the frequency of said alternating current and said other electric clock or clocks although propelled by the alternating current will indicate time in accordance with the frequency of said alternating current after a temporary current cessation.

10. In combination; a clock comprising, a source of stored energy, a shaft driven thereby, an escapement for causing the rate of rotation of said shaft to substantially conform to the lapse of time, time indicating means frictionally driven by said shaft; a synchronous motor operated by alternating current of regulated frequency; setting means for at intervals setting said time indicating means in accordance with lapse of time as determined by said synchronous motor; and other means effective after each temporary cessation of alternating current for preventing said setting means from setting said time indicating means until such interval of time after said setting means and said time indicating means have been brought into synchronous indication since said cessation of alternating current.

11. In combination, clock hands, a synchronous motor for operating said clock hands and energized at times from an alternating current source of regulated frequency, a source of mechanically stored energy, time lapse manifesting means operated by said source of mechanically stored energy for correcting the indicating condition of said clock hands due to a temporary cessation of current from said alternating current source, and means controlled by said time lapse manifesting means and by alternating current from said source and responsive to its cessation and return for determining whether said synchronous motor or said time lapse manifesting means shall determine the ultimate indicating condition of said clock hands.

12. In combination, an alternating current power distribution system including a central station and a consumer station, central time indicating means at said central station, consumer time indicating means operated from a local source of energy and located at said consumer station, a synchronous motor operated by current derived from said system and located at said consumer station, means controlled by said synchronous motor for after the lapse of each predetermined number of cycles supplied to said synchronous motor correcting the time indication of said consumer time indicating means only so long as no temporary power cessation has occurred, and means at said central station including said central time indicating means for applying alternating current of a frequency to said system to cause said consumer time indicating means so corrected to correctly indicate time.

13. In combination; a power distribution system supplying alternating current of regulated frequency regulated to correctly manifest the passing of time; one or more electric clocks each including time indicating means, a self-starting synchronous motor, and frictional connecting means connecting said time indicating means to said synchronous motor; each synchronous motor being operated by alternating current from said system; a clock movement comprising energy storing means, time measuring means allowing the dissipation of energy from said energy storing means in accordance with the lapse of time, time manifesting means and frictional connecting means connecting said time manifesting means and said time measuring means; another synchronous motor energized by current from said system; means driven by said another synchronous motor for setting said time manifesting means with respect to said time measuring means; and means driven by said time manifesting means for setting each time indicating means with respect to its synchronous motor; whereby one or more electric clocks operated from an alternating current source indicate time substantially in accordance with the frequency of such source in spite of temporary cessation of current from said source.

14. In a system for indicating correct time, the combination with a time shaft, a first time manifesting means, means for frictionally connecting said shaft and said first time manifesting means, a light and power distribution system delivering alternating current at a fixed average rate of cycles, a synchronous motor operated by current distributed by said system and operating at all times except during accidental power cessation, and means operated by said motor for at intervals setting said first time manifesting means, a second synchronous motor operated by alternating current derived from said distribution system, a second time manifesting means frictionally driven by said second synchronous motor, and means actuated by said first time manifesting means for setting said second time manifesting means, whereby said second time manifesting means indicates time substantially in accordance with the rate of cycles distributed by said system in spite of temporary cessation of current from said system.

15. A system for correctly indicating time comprising in combination, a power distribution system delivering alternating current at a fixed average rate of cycles per unit of time, time lapse manifesting means operated from a local source of stored energy for by dissipating such energy manifesting the passing of time, time indicating means driven by said time lapse manifesting means, a synchronous motor operated by alternating current from said system, setting means controlled by said synchronous motor for at repeated time intervals as determined by the cycle impulses of said system setting said time indicating means, and means controlled by alternating current derived from said power distribution system and effective upon a temporary cessation of alternating current to prevent said setting means from again setting said time indicating means until said setting means has been corrected to a time amount substantially equal to such cessation.

16. A system for correctly indicating time comprising in combination, a power distribution system delivering alternating current at a fixed average rate of cycles per unit of time, time lapse manifesting means operated from a local source of stored energy for by dissipating such energy manifesting the passing of time, time indicating means driven by said time lapse manifesting means, a synchronous motor operated by alternating current from said system, setting means controlled by said synchronous motor for at repeated time intervals as determined by the cycle impulses of said system setting said time indicating means, and means controlled by alternating current derived from said power distribution system and effective upon a temporary cessation of alternating current to prevent said setting means from again setting said time indicating means until a period of time has elapsed since the last setting which period is equal to a multiple of said interval.

17. A system for correctly indicating time comprising in combination, a power distribution system delivering alternating current at a fixed average rate of cycles per unit of time, time lapse manifesting means operated from a local source of stored energy for by dissipating such energy manifesting the passing of time, time indicating means driven by said time lapse manifesting means, a synchronous motor operated by alternating current from said system, and setting means mechanically driven by said synchronous motor for at repeated time intervals as determined by the cycle impulses of said system mechanically setting said time indicating means.

18. A system for correctly indicating time comprising in combination, a power distribution system delivering a predetermined and fixed number of cycles for each relatively long definite unit of time, time lapse manifesting means operated from a local source of stored energy for by dissipating such energy manifesting the passing of time, time indicating means driven by said time lapse manifesting means, a synchronous motor operated by alternating current from said system and operating so long as no current cessation occurs, setting means which if actuated sets said time indicating means with respect to said time lapse manifesting means, electro-responsive means for actuating said setting means, and a contact controlled by said synchronous motor for at repeated time intervals as determined by the summation of cycle impulses derived from said system closing an energizing circuit for said electro-responsive means.

19. Clock setting means for correcting the indicating condition of time manifesting means driven by and frictionally connected to rotary timing means comprising; a first member operatively connected to such time manifesting means, a second member which if actuated may move said first member in either of two directions with respect to said rotary timing means and which moves said first member to a definite and predetermined time indicating position when actuated, a synchronous motor for at repeated time intervals mechanically actuating said second member, and means for continuously energizing said synchronous motor from an alternating current power system having its frequency regulated to deliver a predetermined number of cycles for each such interval of time.

20. Clock setting means for setting time indicating means with respect to rotary timing means driving the same comprising; a first member operatively connected to such time indicating means, a second member which if actuated may either advance or retard the position of said first member and correspondingly actuate such time indicating means with respect to such rotary timing means, electro-responsive means for actuating said second member, an energizing circuit for said electro-responsive means, a synchronous motor continuously energized by alternating current during the presence of such current said current having its frequency regulated to deliver a predetermined number of cycles for each relatively long period of time, and contacts operated by said motor and included in said circuit and closed repeatedly once for each predetermined number of cycles of alternating current.

21. Clock setting means for correcting the indicating condition of time manifesting means driven by and frictionally connected to rotary timing means comprising; a first member operatively connected to such time manifesting means, a second member which if actuated may move said first member in either of two directions with respect to said rotary timing means and which moves said first member to a definite and predetermined time indicating position when actuated, a non-self-starting synchronous motor for at repeated time intervals mechanically actuating said second member, and means for continuously energizing said synchronous motor from an alternating current power system having its frequency regulated to deliver a predetermined number of cycles for each such interval of time, whereby if a temporary cessation of alternating current takes place said motor will stop and remain at rest in spite of the return of alternating current and thereafter not mechanically actuate said second member.

22. In a system for indicating correct time, the combination with a mechanical time lapse manifesting mechanism, stored energy means for driving said mechanism, time manifesting means frictionally connected to said mechanism, a light and power distribution system delivering alternating current at a fixed average rate of cycles, a synchronous motor operated continuously by current distributed by said system, and means including said synchronous motor for after each of successive time intervals setting said time manifesting means, said means being constructed to substantially correctly set said time manifesting means after a temporary cessation of alternating current irrespective of the duration of such cessation.

OSCAR H. DICKE.